(12) United States Patent
Dagan et al.

(10) Patent No.: US 10,025,523 B1
(45) Date of Patent: Jul. 17, 2018

(54) TECHNIQUES FOR PROCESSING DATA REQUESTS DIRECTED TO VIRTUALIZED DEVICES

(75) Inventors: Hagay Dagan, Framingham, MA (US); Qun Fan, Northborough, MA (US); Ofer Michael, Irvine, CA (US); Jiahui Wang, Framingham, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 1791 days.

(21) Appl. No.: 12/655,266

(22) Filed: Dec. 28, 2009

(51) Int. Cl.
*G06F 3/06* (2006.01)

(52) U.S. Cl.
CPC ............ *G06F 3/0635* (2013.01); *G06F 3/067* (2013.01); *G06F 3/0617* (2013.01)

(58) Field of Classification Search
CPC ....... G06F 3/067; G06F 3/0617; G06F 3/0635
See application file for complete search history.

(56) References Cited

U.S. PATENT DOCUMENTS

| | | | |
|---|---|---|---|
| 5,206,939 A | 4/1993 | Yanai et al. | |
| 5,544,347 A | 8/1996 | Yanai | |
| 5,742,792 A * | 4/1998 | Yanai et al. | 711/162 |
| 5,778,394 A | 7/1998 | Galtzur et al. | |
| 5,845,147 A | 12/1998 | Vishlitzky et al. | |
| 5,857,208 A | 1/1999 | Ofek | |
| 6,732,231 B1 * | 5/2004 | Don | G06F 11/006 |
| | | | 711/114 |
| 6,807,619 B1 | 10/2004 | Ezra et al. | |
| 6,820,035 B1 * | 11/2004 | Zahavi | G06F 11/3414 |
| | | | 702/182 |
| 7,143,393 B1 | 11/2006 | Ezra et al. | |
| 2002/0062429 A1 * | 5/2002 | Tsuboki | G06F 3/0605 |
| | | | 711/154 |
| 2003/0005355 A1 * | 1/2003 | Yanai et al. | 714/7 |
| 2003/0088720 A1 * | 5/2003 | Fukuzawa | G06F 3/0623 |
| | | | 710/65 |

(Continued)

OTHER PUBLICATIONS

"Products: Universal Storage Platform VM", http://www.hds.com/products/storage-systems/universal-storage-platform-vm.html, 2009, 2 pages, internet publication by Hitachi Data Systems.

(Continued)

*Primary Examiner* — Edward J Dudek, Jr.
(74) *Attorney, Agent, or Firm* — Muirhead and Saturnelli, LLC

(57) ABSTRACT

Described are techniques for processing a data request for a device of a data storage system. A data request directed to a device that is a virtualized device of the data storage system is received. The data storage system has a plurality of devices comprising one or more local devices and one or more virtualized devices. Each of the local devices is a storage device included in the data storage system and each of the virtualized devices is an external storage device with respect to the data storage system and is presented as a local storage device of the data storage system. First processing is performed by a disk adapter in connection with servicing the data request for the device. The first processing includes sending the request to an external storage device corresponding to the virtualized device over a connection in accordance with path information obtained from discovery processing.

19 Claims, 14 Drawing Sheets

(56) References Cited

U.S. PATENT DOCUMENTS

| | | | |
|---|---|---|---|
| 2003/0110351 A1* | 6/2003 | Blood | G06F 3/0607 711/111 |
| 2005/0005066 A1* | 1/2005 | Nakayama | G06F 3/067 711/117 |
| 2005/0132155 A1* | 6/2005 | Kasako | 711/162 |
| 2005/0154828 A1* | 7/2005 | Sugino et al. | 711/114 |
| 2005/0198436 A1* | 9/2005 | Iida et al. | 711/114 |
| 2005/0210130 A1* | 9/2005 | Tanaka | G06F 3/0607 709/224 |
| 2006/0085609 A1* | 4/2006 | Ninose et al. | 711/162 |
| 2007/0008988 A1* | 1/2007 | Kim | H04L 12/2803 370/462 |
| 2007/0033343 A1* | 2/2007 | Iida et al. | 711/114 |
| 2007/0061532 A1* | 3/2007 | Hirakawa et al. | 711/162 |
| 2008/0209123 A1* | 8/2008 | Iida et al. | 711/114 |
| 2008/0244035 A1* | 10/2008 | Horie | G06F 3/0613 709/217 |
| 2009/0193208 A1* | 7/2009 | Ozaki et al. | 711/162 |
| 2009/0248759 A1* | 10/2009 | Okada | G06F 11/1456 |
| 2010/0205370 A1* | 8/2010 | Ikawa et al. | 711/114 |
| 2011/0179241 A1* | 7/2011 | Suzuki et al. | 711/162 |

OTHER PUBLICATIONS

Zimmermann, Francois; Technical Brief, "Hitachi Universal Storage Platform V and Universal Storage Platform VM Data Migration Options", Jun. 2009, http://www.hds.com/assets/pdf/hitachi-usp-v-and-usp-vm-data-migration-options.pdf, 38 pages, internet publication by Hitachi Data Systems.

Harker, John, Hitachi Universal Storage Platform V and Universal Storage Platform VM, Cost Effective Tiered Storage Options, Design Guide, Nov. 2008, http://www.hds.com/assets/pdf/hitachi-tiered-storage-options-design-guide.pdf, 21 pages, internet publication by Hitachi Data Systems.

\* cited by examiner

TECHNIQUES FOR PROCESSING DATA REQUESTS DIRECTED TO VIRTUALIZED DEVICES

BACKGROUND

Technical Field

This application generally relates to data storage, and more particularly to techniques used for data storage virtualization.

Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. Such storage devices are provided, for example, by EMC Corporation of Hopkinton, Mass. and disclosed in U.S. Pat. No. 5,206,939 to Yanai et al., U.S. Pat. No. 5,778,394 to Galtzur et al., U.S. Pat. No. 5,845,147 to Vishlitzky et al., and U.S. Pat. No. 5,857,208 to Ofek. The host systems access the storage device through a plurality of channels provided therewith. Host systems provide data and access control information through the channels to the storage device and storage device provides data to the host systems also through the channels. The host systems do not address the disk drives of the storage device directly, but rather, access what appears to the host systems as a plurality of logical disk units, logical devices or logical volumes. The logical disk units may or may not correspond to the actual physical disk drives. Allowing multiple host systems to access the single storage device unit allows the host systems to share data stored therein.

Two components having connectivity to one another, such as a host and a data storage system, may communicate using a communication connection. In one arrangement, the data storage system and the host may reside at the same physical site or location. Techniques exist for providing a remote mirror or copy of a device of the local data storage system so that a copy of data from one or more devices of the local data storage system may be stored on a second remote data storage system. Such remote copies of data may be desired so that, in the event of a disaster or other event causing the local data storage system to be unavailable, operations may continue using the remote mirror or copy.

In another arrangement, the host may communicate with a virtualized storage pool of one or more data storage systems. In this arrangement, the host may issue a command, for example, to write to a device of the virtualized storage pool. In some existing systems, processing may be performed by a front end component of a first data storage system of the pool to further forward or direct the command to another data storage system of the pool. Such processing may be performed when the receiving first data storage system does not include the device to which the command is directed. The first data storage system may direct the command to another data storage system of the pool which includes the device. The front end component may be a host adapter of the first receiving data storage system which receives commands from the host. In such arrangements, the front end component of the first data storage system may become a bottleneck in that the front end component processes commands directed to devices of the first data storage system and, additionally, performs processing for forwarding commands to other data storage systems of the pool as just described.

SUMMARY OF THE INVENTION

In accordance with one aspect of the invention is a computer implemented method for processing a data request for a device of a data storage system. The data request directed to a device that is a virtualized device of the data storage system is received. The data storage system has a plurality of devices comprising one or more local devices and one or more virtualized devices. Each of the one or more local devices is a storage device included in the data storage system. Each of the one or more virtualized devices is an external storage device with respect to the data storage system and is presented as a local storage device of the data storage system. First processing is performed by a disk adapter in connection with servicing the data request for the device. The first processing includes sending the request to an external storage device corresponding to the virtualized device over a connection in accordance with path information obtained from discovery processing. The disk adapter may be connection to a network providing connectivity to a second data storage system including said external storage device corresponding to the virtualized device. The request may be sent over a connection in accordance with path information obtained from discovery processing. The path information may identify a path over the network between a port of the disk adapter and a port of a front end component of the second data storage system, and the data request may be transmitted to the second data storage system using said path. The discovery processing may be performed by the disk adapter to determine connectivity between at least one port of the disk adapter and other network entities including a second data storage system. The disk adapter may be directly connected to a second data storage system including said external storage device. The data request may identify the device using a local device identifier of the data storage system, each of said plurality of devices being associated with a different local device identifier and uniquely identifying said each device from others of said plurality of devices. The first processing may be performed by the disk adapter as part of destaging data from a cache of the data storage system to the virtualized device. The data storage system may include a first logical device that has a plurality of mirrors including a first mirror and a second mirror, said first mirror being a first of said one or more local devices and said second mirror being a first of said one or more virtualized devices, said first and said second mirrors being serviced by said disk adapter. The method may also include setting one of said first mirror and said second mirror as an invalid mirror and the other of said first mirror and said second mirror as a valid mirror, wherein said invalid mirror does not include a valid copy of data for said first logical device, and in response to said one mirror being an invalid mirror, performing second processing by said disk adapter to copy data from said valid mirror to said invalid mirror. The second mirror may be associated with a device included in a second data storage system having connectivity to said disk adapter over a network connection. The disk adapter may use path information obtained by discovery processing to send the data that is copied from said valid mirror to said invalid mirror. The valid mirror may be configured from storage for a RAID group providing a level of data protection. The invalid mirror may be a single device that is not configured from storage for a RAID group.

In accordance with another aspect of the invention is a data storage system comprising: a first set of one or more local storage devices included in the data storage system; and a disk adapter having connectivity to a second set of one or more storage devices that are external with respect to the data storage system. Each storage device of said second set of devices is a virtualized storage device presented as a local storage device of the data storage system. Each storage device in said first set and each storage device in said second set may be referenced by a local device identifier of the data storage system. A data request directed to a storage device of the data storage system may reference a local device identifier of the data storage system bound to the storage device. The data storage system may include first executable code stored on computer readable medium and said disk adapter may be configured to execute the first executable code, the computer readable medium comprising the first executable code that: determines whether a request is directed to a local storage device or a virtualized storage device of the data storage system; and if the request is directed to a virtualized storage device, transmits the request to an external storage device corresponding to the virtualized storage device over a connection in accordance with path information obtained from discovery processing. A first logical device of the data storage system may be configured to have a first mirror and a second mirror, at least one of said first mirror and said second mirror being one of said storage devices in said second set of virtualized storage devices.

In accordance with another aspect of the invention is a computer readable memory comprising executable instructions thereon for processing a data request for a device of a data storage system, the computer readable memory comprising executable instructions that: receive the data request directed to a device that is a virtualized device of the data storage system, said data storage system having a plurality of devices comprising one or more local devices and one or more virtualized devices, wherein each of said one or more local devices is a storage device included in the data storage system and each of said one or more virtualized devices is an external storage device with respect to the data storage system and is presented as a local storage device of the data storage system; and perform first processing by a disk adapter in connection with servicing the data request for said device, said first processing including sending the request to an external storage device corresponding to the virtualized device over a connection in accordance with path information obtained from discovery processing. The disk adapter may be connected to a network providing connectivity to a second data storage system including said external storage device corresponding to the virtualized device.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF
EMBODIMENT(S)

Figure 1:
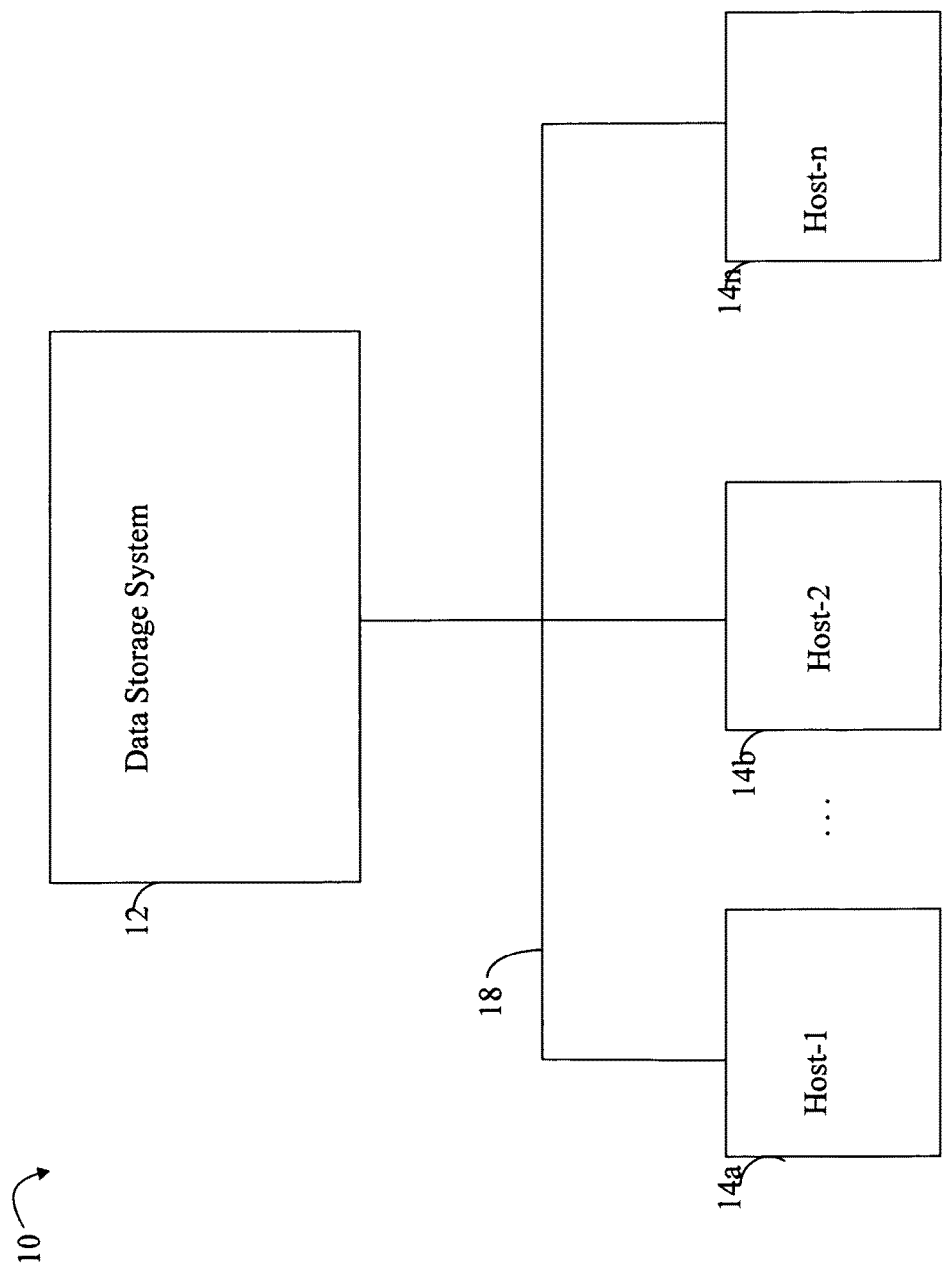
FIG. 1 is an example of an embodiment of a computer system that may utilize the techniques described herein.

Referring to FIG. 1, shown is an example of an embodiment of a system that may be used in performing the techniques described herein. The system 10 includes a data storage system 12, such as a data storage array, connected to host systems 14a-14n through communication medium 18. In this embodiment of the system 10, the N hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage system 12, and may also communicate with others included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particulars of the hardware and software included in each of the components that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the system 10 may use a variety of different communication protocols such as TCP. SCSI, Fibre Channel, or iSCSI, and the like. Some or all of the connections by which the hosts and data storage system 12 may be connected to the communication medium 18 may pass through other communication devices, such as a Connectrix or other switching equipment that may exist such as a phone line, a repeater, a multiplexer or even a satellite.

Each of the host computer systems may perform different types of data operations in accordance with different types of administrative tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12. It should be noted that the data storage system 12 of FIG. 1 may physically be a single data storage system, such as a single data storage array as EMC's Symmetrix™ data storage system, as well one or more other data storage systems as may vary with embodiment.

Figure 2A:
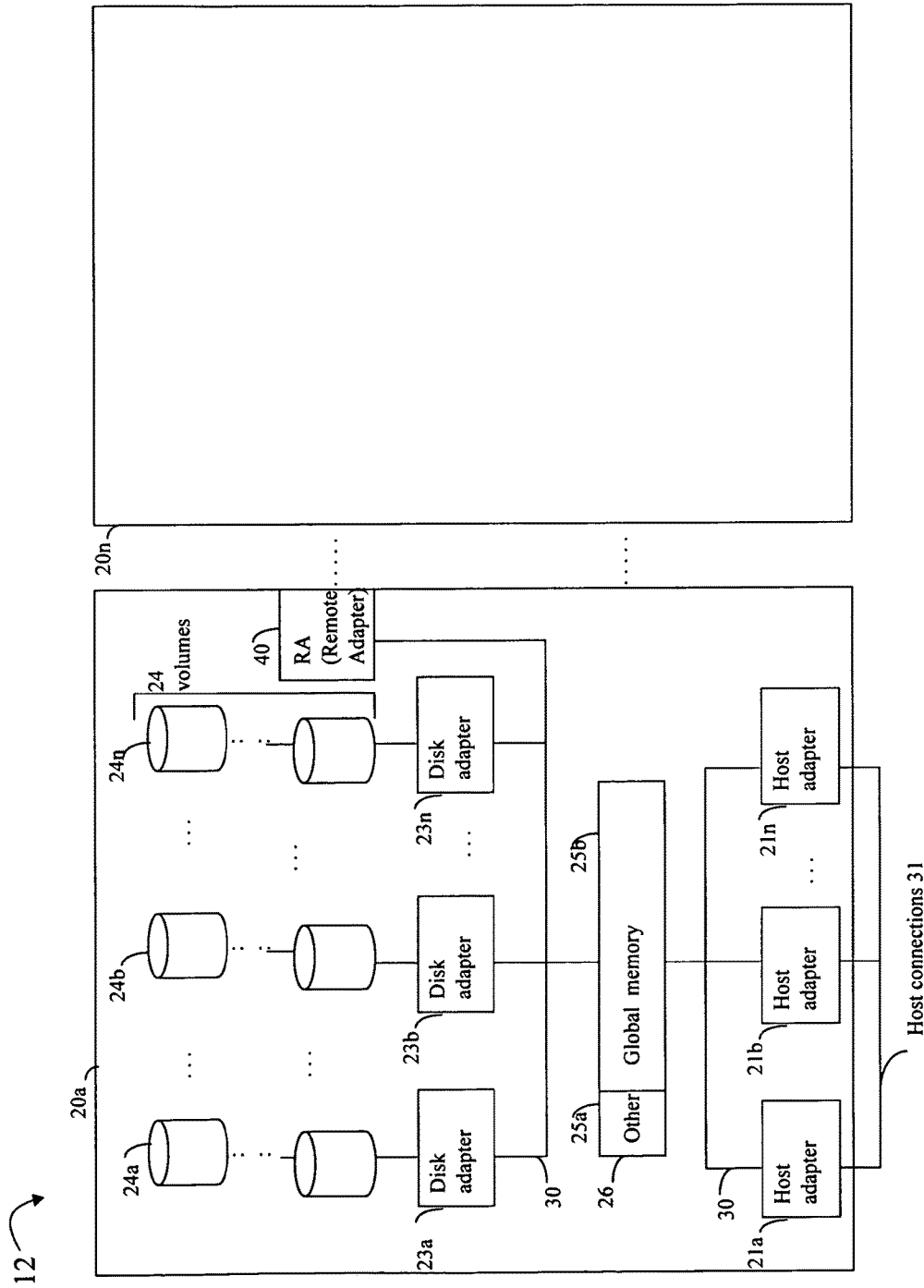
FIG. 2A is an example of an embodiment of a data storage system.

Referring to FIG. 2A, shown is an example of an embodiment of the data storage system 12 that may be included in the system 10 of FIG. 1. Included in the data storage system 12 of FIG. 2A are one or more data storage systems 20a-20n as may be manufactured by one or more different vendors. Each of the data storage systems 20a-20n may be interconnected (not shown). Additionally, the data storage systems may also be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage system 12. In this example as described in more detail in following paragraphs, reference is made to the more detailed view of element 20a. It should be noted that a similar more detailed description may also apply to any one or more of the other elements, such as 20n, but have been omitted for simplicity of explanation. It should also be noted that an embodiment may include data storage systems from one or more vendors. Each of 20a-20n may be resources included in an embodiment of the system 10 of FIG. 1 to provide storage services to, for example, host computer systems. It should be noted that the data storage system 12 may operate stand-alone, or may also included as part of a storage area network (SAN) that includes, for example, other components.

Each of the data storage systems, such as 20a, may include a plurality of disk devices or volumes, such as the arrangement 24 consisting of n rows of disks or volumes 24a-24n. In this arrangement, each row of disks or volumes may be connected to a disk adapter ("DA") or director responsible for the backend management of operations to and from a portion of the disks or volumes 24. In the system 20a, a single DA, such as 23a, may be responsible for the management of a row of disks or volumes, such as row 24a. In a data storage system such as by EMC Corporation, a backend DA may also be referred to as a disk controller. The DA may performed operations such as reading data from, and writing data to, the physical devices which are serviced by the DA.

The system 20a may also include one or more host adapters ("HAs") or directors 21a-21n. Each of these HAs may be used to manage communications and data operations between one or more host systems and the global memory. In an embodiment, the HA may be a Fibre Channel Adapter (FA) or other adapter which facilitates host communication. Generally, directors may also be characterized as the different adapters, such as HAs (including FAs), DAs RAs and the like, as described herein. Components of the data storage system, such as an HA, which may communicate with a host may also be referred to as front end components. A component of the data storage system which communicates with a front end component, such as a DA, may be characterized as a backend component.

One or more internal logical communication paths may exist between the DAs, the RAs, the HAs, and the memory 26. An embodiment, for example, may use one or more internal busses and/or communication modules. For example, the global memory portion 25b may be used to facilitate data transfers and other communications between the DAs, HAs and RAs in a data storage system. In one embodiment, the DAs 23a-23n may perform data operations using a cache that may be included in the global memory 25b, for example, in communications with other disk adapters or directors, and other components of the system 20a. The other portion 25a is that portion of memory that may be used in connection with other designations that may vary in accordance with each embodiment.

The particular data storage system as described in this embodiment, or a particular device thereof, such as a disk, should not be construed as a limitation. Other types of commercially available data storage systems, as well as processors and hardware controlling access to these particular devices, may also be included in an embodiment.

Also shown in the storage system 20a is an RA or remote adapter 40. The RA may be hardware including a processor used to facilitate communication between data storage systems, such as between two of the same or different types of data storage systems.

Host systems provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical volumes (LVs). The LVs may or may not correspond to the actual or physical disk drives. For example, one or more LVs may reside on a single physical disk drive. Data in a single storage system may be accessed by multiple hosts allowing the hosts to share the data residing therein. The HAs may be used in connection with communications between a data storage system and a host system. The RAs may be used in facilitating communications between two data storage systems. The DAs may be used in connection with facilitating communications to the associated disk drive(s) and LV(s) residing thereon. A LUN or logical unit number may be characterized as a disk array or data storage system reference to an amount of disk space that has been formatted and allocated for use to one or more hosts. An LV may further map, for example, to a single LUN, more than one LUN, and/or a portion of a LUN.

The DA performs I/O operations on a disk drive. Data residing on an LV may be accessed by the DA following a data request in connection with I/O operations that other directors originate.

Figure 2B:
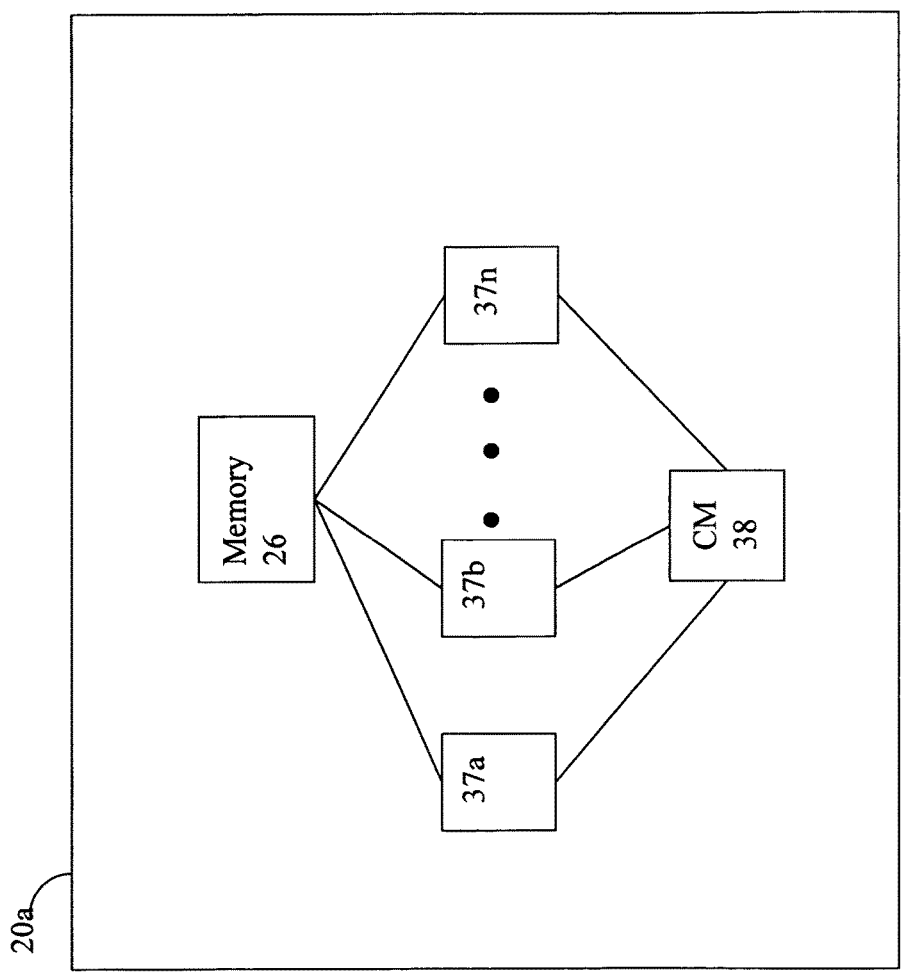
FIG. 2B is a representation of the logical internal communications between the directors and memory included in one embodiment of data storage system of FIG. 2A.

Referring to FIG. 2B, shown is a representation of the logical internal communications between the directors and memory included in a data storage system. Included in FIG. 2B is a plurality of directors 37a-37n coupled to the memory 26. Each of the directors 37a-37n represents one of the HA's, RA's, or DA's that may be included in a data storage system. In an embodiment disclosed herein, there may be up to sixteen directors coupled to the memory 26. Other embodiments may use a higher or lower maximum number of directors that may vary. For example, an embodiment in accordance with techniques herein may support up to 128 directors per data storage system, such as a data storage array. The representation of FIG. 2B also includes an optional communication module (CM) 38 that provides an alternative communication path between the directors 37a-37n. Each of the directors 37a-37n may be coupled to the CM 54 so that any one of the directors 37a-37n may send a message and/or data to any other one of the directors 37a-37n without needing to go through the memory 26. The CM 54 may be implemented using conventional MUX/router technology where a sending one of the directors 37a-37n provides an appropriate address to cause a message and/or data to be received by an intended receiving one of the directors 37a-37n. In addition, a sending one of the directors' 37a-37n may be able to broadcast a message to all of the other directors 37a-37n at the same time.

With reference back to FIG. 2A, components of the data storage system may communicate using GM 25b. For example, in connection with returning data to a host from one of the devices as part of a read operation, the data may be copied from the device by the appropriate DA servicing the device. The DA may copy the data read into a cache slot included in GM which is, in turn, communicated to the appropriate HA in communication with the host.

As described above, an embodiment may include a cache in the global memory portion 25b of FIG. 2. An embodiment may include any one of a variety of different caching data structures and management techniques. Examples of different types of cache arrangements are described, for example, in U.S. Pat. No. 6,807,619, Oct. 19, 2004, ADVANCING BANK POINTER IN PRIME NUMBERS UNIT, Ezra et al., and U.S. Pat. No. 7,143,393, Nov. 28, 2006, METHOD FOR CACHE MANAGEMENT FOR POSITIONING CACHE SLOT, Ezra et al., both of which are incorporated by reference herein. The foregoing are just some examples of cache arrangements that may be used in an embodiment with the techniques herein.

It should be noted that an embodiment may use different techniques in connection with data that is read from, or written to, devices in the data storage system. For example, the cache may be used in connection with processing data for read and write operations. In connection with a read operation, the DA may read the data requested from the device and store it in a cache slot included in cache. The DA, for example, may obtain a cache slot if there is not already one allocated and associated with a particular data track. The data is read from the physical device by the DA and stored in the cache slot. Indicators associated with the cache slot and other structures may be appropriately updated in accordance with the data operation, the state of the data included in the cache slot, and the like. Data that is to be written to a device may be first stored in a cache slot and the cache slot may be appropriately updated (e.g., marked as a write pending by setting appropriate indicators of the cache slot and other data structures). The data is then actually written out or destaged to the physical device by a DA servicing the device at a later point in time.

One or more logical devices of a data storage system may be accessible to a host through a selected initiator port on the host and a selected target port of the data storage system. In an embodiment using SCSI communications, an initiator port may be a port of a host bus adapter (HBA) of the host. A target port may be a port of an HA of the data storage system. A connection between the initiator port (host) and target port (data storage system) may be established and used to transmit messages such as commands between the host and data storage system. As an example from the host's point of view (or point of view of an application executing on the host), the following may be used in sending a command from the host directed to a logical device of a data storage system: the initiator port, the target port and a LUN. As mentioned above, a LUN may be characterized as an identifier used to specify a particular logical device of the data storage system, such as in connection with an application executing on the host when the application sends a SCSI or iSCSI command to the data storage system.

What will be described in following paragraphs are techniques that may be used in connection with providing a backend virtualization of remote or external devices using the DA. Using techniques described herein, the DA included in a first data storage system may be used to provide virtual storage devices of the first data storage system. The virtualized devices may actually be external to the first data storage system and, using techniques herein, the virtualized devices appear to be local devices of the first data storage system. For example, a first storage array may include one or more local storage devices therein and a DA. The DA may be connected, such as through a network, switch or other connection, to one or more other storage devices which are external with respect to the first storage array. Using techniques herein, the one or more other external storage devices may be virtualized using the DA and appear to a host or other component of the first storage array to be local devices of the first storage array. As an example, the one or more other external storage devices may be included in a second storage array and the DA may communicate with an FA of the second storage array over a network connection, such as a SAN, to provide for such virtualization so that the external storage devices appear to be included in, or local to (e.g., directly attached to), the first storage array. The external storage device may be bound or mapped to a local device name of the first storage array through the DA so that there is no distinction in referencing a first storage device which is actually included in the first storage system (e.g., local to the first storage system) and a second virtualized device of the first storage array which is an external storage device appearing as a virtualized device of the first storage array.

Figure 3:
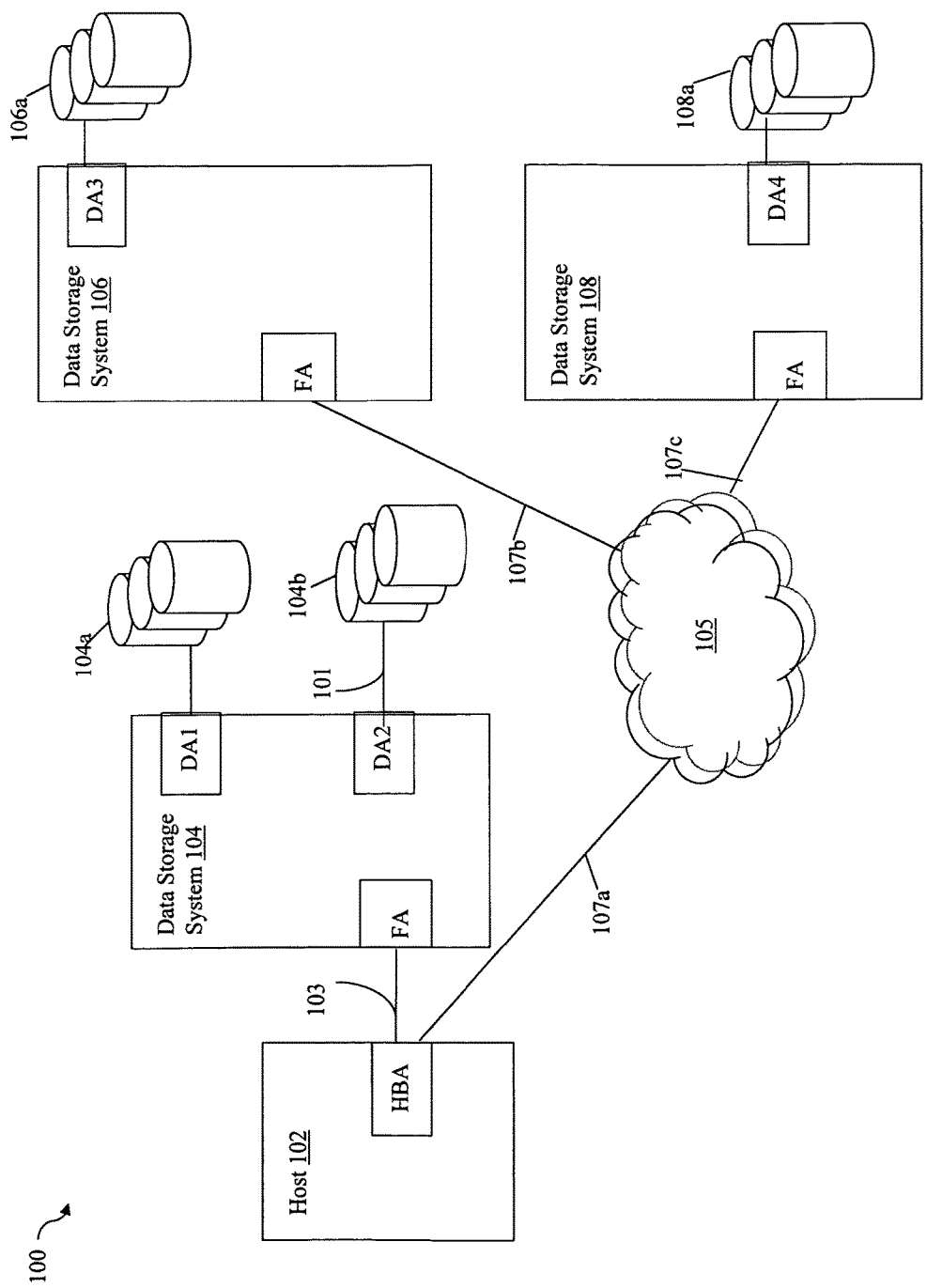
FIG. 3 is an example illustrating a system and network prior to implementation of the techniques herein.

Referring to FIG. 3, shown is an example of an embodiment of a system and network that may be used in connection with techniques herein. The example 100 includes a host 102, data storage systems 104, 106 and 108, and network 105 The host 102 may communicate, such as using the HBA of the host, with systems 104, 106 and/or 108 over illustrated connections and the network 105. The host 102 may communicate directly with system 104 over connection 103 so that host 102 and 104 may be physically located at a same site. The system 104 may be characterized as local with respect to the host 102 and system 104. The host 102 may communicate over connection 107a, network 105, and connection 107b to system 106. The host may communicate over connection 107a, network 105 and connection 107c with system 108. Data storage systems 106 and 108 may be characterized as remote with respect to the host 102. The systems 106 and 108 may be located at different physical sites or locations than the host 102 and system 104. Each of the systems 104, 106 and 108 may include components such as DAs, RAs, and FAs, as illustrated and described in connection with FIGS. 1, 2A and 2B even though only selected components may be illustrated in FIG. 3 and other figures for purposes of simplification in describing the techniques herein. DA1 of system 104 may service devices 104a. Similarly, DA2, DA3 and DA4 may each respectively service devices 104b, 106a and 108a.

In connection with techniques herein for providing virtualized storage devices, a back end component, such as a DA2 of FIG. 3, is modified to have an external connection providing access to one or more other external storage devices such as, for example, may be included in one or more other data storage systems through a network.

Figure 4:
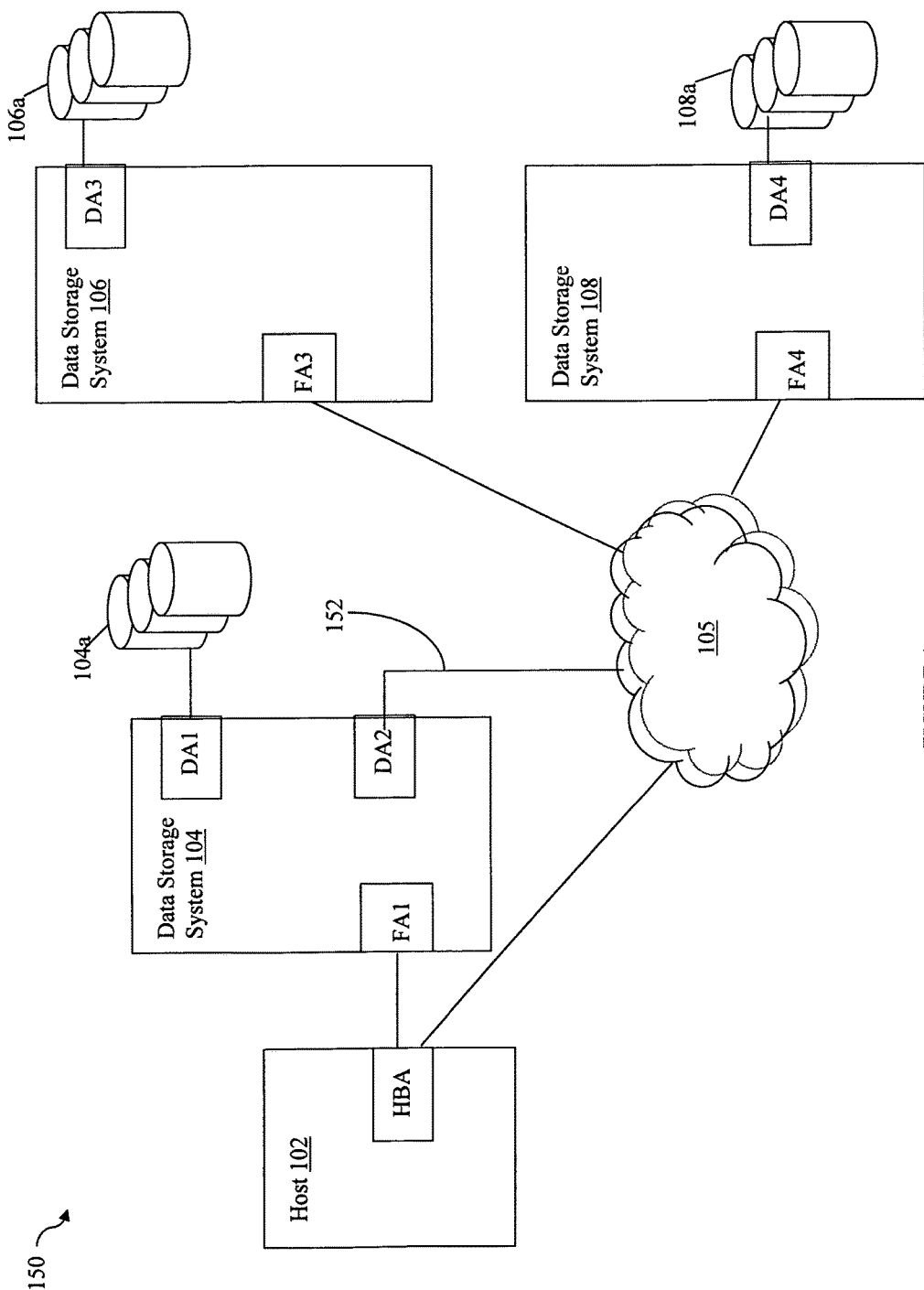
FIGS. 4, 5, and 6 are examples illustrating systems and networks that may be used in an embodiment in accordance with techniques herein.

Referring to FIG. 4, shown is an example illustrating a step in connection with modifying the components of FIG. 3 for use in connection with techniques herein. The example 150 includes DA2 of data storage system 104 connected to network 105 as illustrated by 152. DA2 may be connected 152 to a component, such as a switch, of a SAN so that connection 152 may replace the connection 101 of FIG. 3. Through 152, DA2 has connectivity over network 105 and connection 107b to FA3 of data storage system 106 and over network 105 and connection 107c to FA4 of data storage system 108. In one embodiment described in more detail below, one or more devices of data storage 106a may be accessible to DA2 through FA3 and connectivity between DA2 and FA3. Similarly, one or more devices of data storage 108a may be accessible to DA2 through FA4 and connectivity between DA2 and FA4. Components (e.g., such as DAs and FAs) of the data storage systems 104, 106 and 108 may have one or more ports used for communicating with other network entities.

As a generalization to that described above, DA2 may have connectivity to one or more storage devices which are external with respect to the data storage system 104 rather than local (or included in) the system 104. For example, DA2 may be directly connected (such as through a direct hardwired connection with no intervening network) to an FA of another data storage system. As an alternative arrangement to that as illustrated in 150, DA2 may have a connection directly to FA3 and/or FA4 (e.g., such as using a hardwired direct connection therebetween) if systems 106 and/or 108, respectively, are located at the same physical site as the system 104. The foregoing describes a connection between DA2 and FA3 and also between DA2 and FA4 without the intervening network 105.

Figure 5:
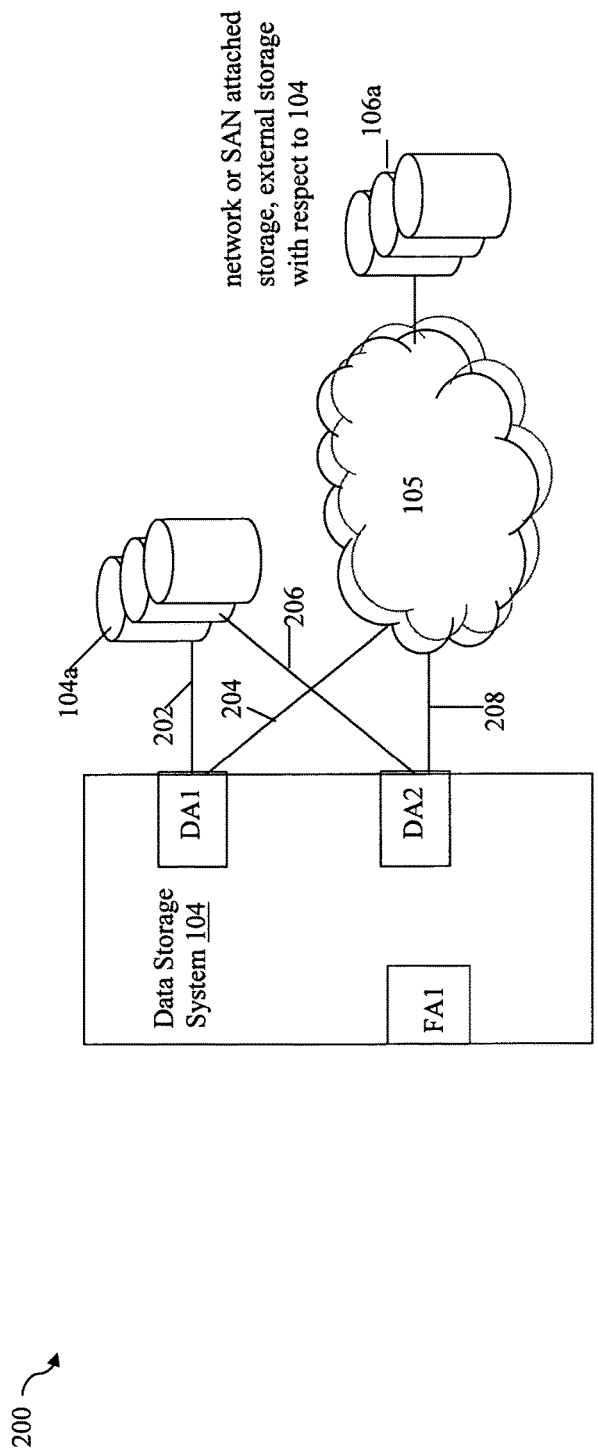

Referring to FIG. 5, shown is additional detail regarding DA port allocation in an embodiment in accordance with techniques herein. The example 200 provides additional detail regarding the connections that may exist between DAs and devices in the data storage system 104. In one embodiment, DA ports may be allocated in pairs to service one or more devices. For each DA port in the pair, one port may be indicated as the primary and the other port as a secondary port. A port of a DA may be allocated for servicing data requests (e.g., such as to read and write data) for a device or group of devices. The pair of ports may be used to provide hardware redundancy and fault tolerance so that if the primary port is unable to service the designated one or more devices, the secondary port may alternatively be utilized to service the one or more devices. In this example, devices of 104a may be serviced by a port of DA1 (as illustrated by 202) and a port of DA2 (as illustrated by 206). Devices 106a (e.g., which are physically or actually included as devices of the data storage system 106 and virtually included or presented as devices of data storage system 104) may be serviced by a port of DA1 (as illustrated by 204) and a port of DA2 (as illustrated by 208). As previously illustrated in FIG. 4, the devices 104a may be characterized as actually or physically included in the system 104 and local with respect to the system 104. In contrast, the devices 106a may be characterized as external with respect to the system 104 and local with respect to the system 106 (e.g., devices 106a are physically included as a component of the system 106). In this example, the devices 106a may be network attached external storage devices with respect to the system 104. The devices 108a of system 108 may also be serviced by a pair of ports in a manner similar to that as illustrated for devices 106a. For example, devices 108a may be serviced by the same ports of DA1 and DA2 as devices 106a.

It should be noted that FIG. 4 and others herein may not illustrate the dual ports servicing a same one or more devices. Rather, for purposes of illustration, figures may illustrate the connectivity provided by a single primary port of a designated pair.

Figure 6:
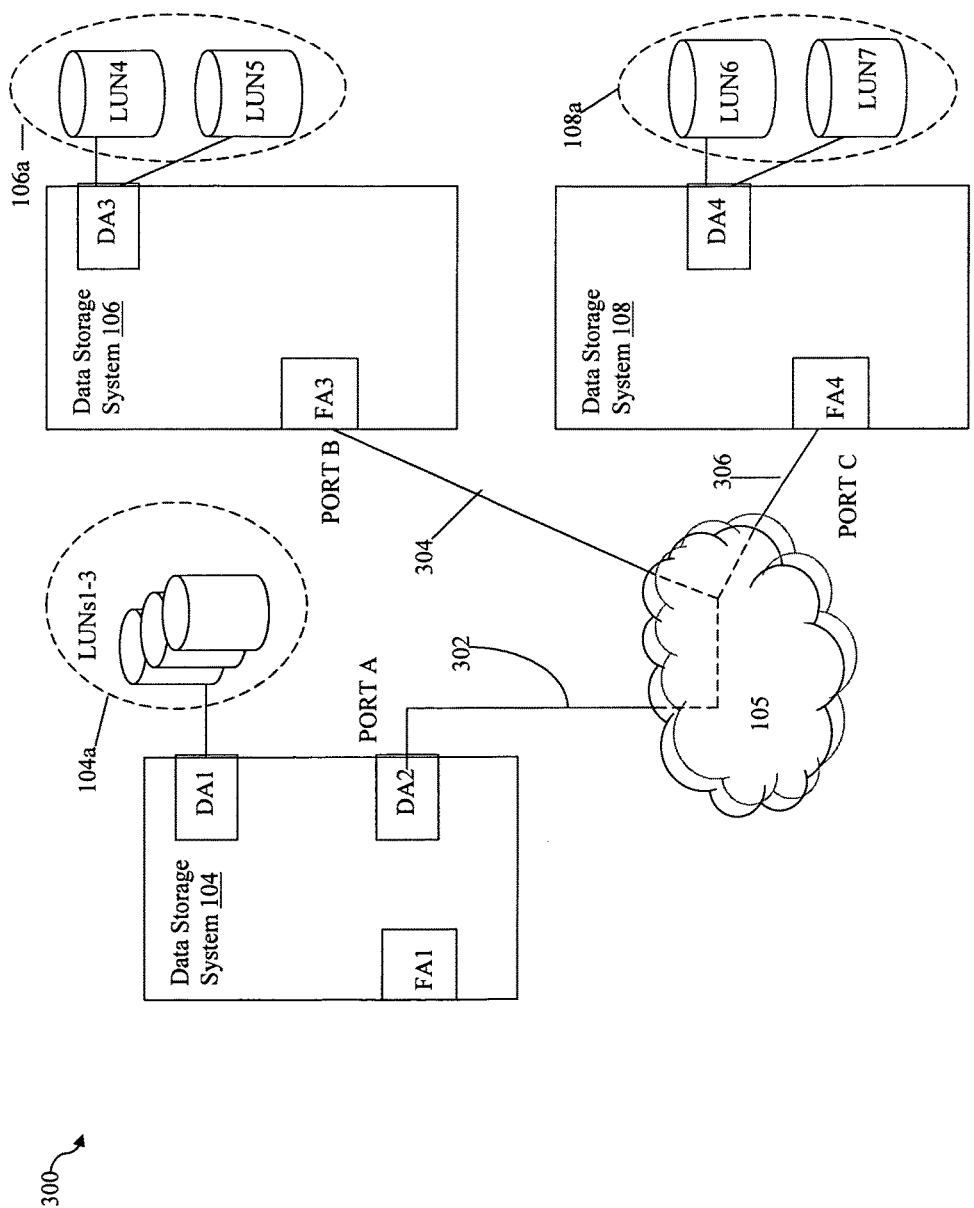

Referring to FIG. 6, shown is an example illustrating in further detail the connectivity or paths that may be provided between the components of FIG. 4 in accordance with the techniques herein. The example 300 illustrates in more detail the connectivity or paths from DA2 to systems 106 and 108 as provided through the network 105. Port A of DA2 is connected to port B of FA3 through a connection formed by 302 and 304. Through port B of FA3, LUNs 4 and 5 of 106a are visible or accessible to port A of DA2. With respect to data storage system 104 and DA2, LUNs 4 and 5 may be characterized as remotely accessible or external devices of another data storage system which appear, through the use of virtualization techniques of the DA2, as local devices of the system 104. LUN4 and LUN5 may represent the local name or binding of the system 104 provided to such external or remote devices of the system 106 which are virtualized in connection with techniques herein. Using such a local name or binding allows for such external or remote devices accessible through the DA2 to be referenced as if included as a local device of the system 104 (e.g., devices directly attached to the DA2 of 104 such as devices 104a).

As also illustrated in the example 300, port A of DA2 is connected to port C of FA4 through a connection formed by 302 and 306. Through port C of FA4, LUNs 6 and 7 of 106a are visible or accessible to port A of DA2. With respect to data storage system 104 and DA2, LUNs 6 and 7 may be characterized as remotely accessible or external devices of another data storage system which appear, through the use of virtualization techniques of the DA2, as local devices of the system 104. LUN6 and LUN7 may represent the local name or binding of the system 104 provided to such external or remote devices of the system 108 which are virtualized in connection with techniques herein.

Management software may be used for data storage configuration to define the foregoing connectivity and what devices are accessible or visible over those paths for use in connection with the virtualized backend storage techniques described herein.

The foregoing connectivity and paths between DA2-FA3 and DA2-FA4 may be obtained as a result of performing discovery. As known in the art, discovery processing may be performed as part of initialization or startup of the data storage system 104. Discovery processing may be performed generally to discover what ports and LUNs are visible or accessible from a particular port of the system 104 and to determine existing connectivity or paths between network entities such as between a port of the system 104 and a port of another network entity. In connection with the techniques herein with reference to FIG. 6, DA2 may connect to the network 105 and login or register the WWN (world wide name) or identifier associated with each of its port(s). The foregoing may be done with respect to a WWN server, for example, to track which entities are connected to the network. DA2 may then issue a discovery system call to discover which other ports are visible or accessible from port A of DA2. For each remote port discovered as accessible from port A, the remote port may be queried to determine what LUNs are accessible through the remote port. Thus, as a result of DA2's discovery processing with respect to port A, connectivity and path information may be obtained and stored for use in connection with techniques herein. Discovery processing may determine one or more paths from port A to each external device. Each external device may also be bound or mapped to a local name or identifier with respect to the data storage system 104 and the local name or identifier may be stored with its associated path information. Such information may be used by DA2 when DA2 is servicing a request for LUN4, 5, 6 or 7. For example, port A of DA2 may be the primary port servicing LUNs 4, 5, 6, and 7. As illustrated, the foregoing LUNs 4-7 are virtual storage devices of the system 104 which are actually external storage devices of other data storage systems presented as local storage devices of the system 104 using techniques herein. When DA2 services a read or write request with respect to data of any of LUNs 4-7, DA2 may determine that the LUN being serviced is a virtualized external device and issue the request to the LUN using the appropriate connectivity information. Those devices, such as LUNs 4-7, may be marked as virtual devices. Such information regarding which devices are virtualized in connection with techniques herein may be indicated, for example, in device configuration data.

It should be noted that the local device identifiers of a data storage system may refer to a device identifier which uniquely identifies a device within the single data storage system.

Figure 7:
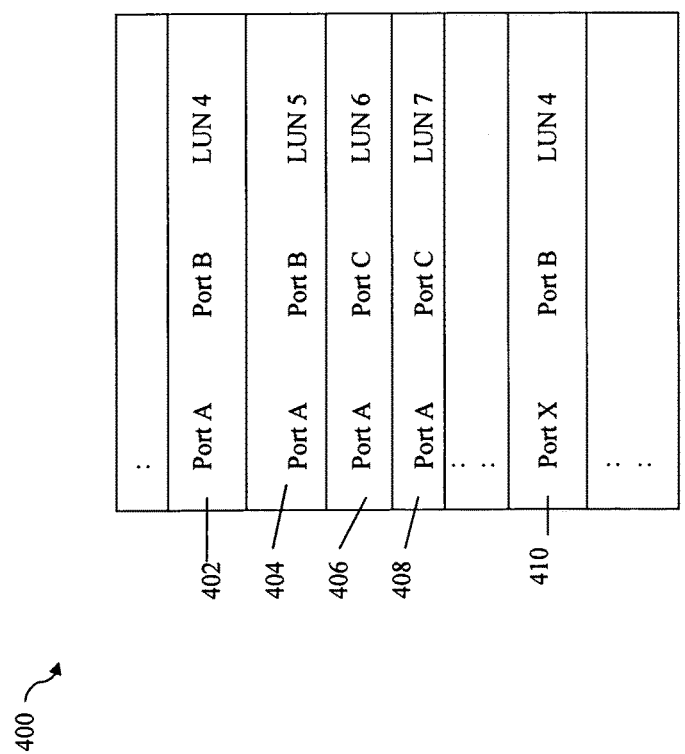
FIG. 7 is an example illustrating discovery information that may be used in an embodiment in accordance with techniques herein.

Referring to FIG. 7, shown is an example representation of information that may be obtained from discovery processing for use with techniques herein. The example 400 illustrates path or connectivity information that may be stored regarding paths between a source port of a component of data storage system 104 and an external LUN. For example, with reference to FIG. 6, elements 402, 404, 406 and 408 illustrate path information from port A of DA2 to, respectively, LUNs 4-7. When DA2 receives a request for LUN5, DA2 may obtain the appropriate path information 404 and use such information to transmit the request to data storage system 106 for processing. In connection with the foregoing for LUN5 with respect to SCSI communications, port A of DA2 may be characterized as an initiator of the request for LUN5 in a manner similar to when a host's HBA issues an I/O request to a data storage system. Port A of DA2 may also receive an appropriate responses and/or data from the system 106. For example, if the request is to read data from LUN5, the system 106 may return a response to port A of DA2 where the response includes the data read from the device. DA2 may process the data read in a manner similar to that as if read from a local device of the data storage system 104.

The example 400 also illustrates that a single LUN, such as LUN4, may be available or accessible through multiple paths. For example, elements 402 and 410 illustrate two paths to LUN 4. Although not illustrated in FIG. 6, port X of element 410 may be another port of another DA of the system 104 which is connected to the network 105 in a manner similar to DA2.

The information of the example 400 as may be used by a DA, such as DA2, in connection with performing techniques herein may be stored in memory local to the DA.

In a data storage system such as 104 of FIG. 6, a same set of services and operations may be performed with respect to both local devices (e.g., LUNs 1-3) and virtualized devices (e.g., LUNs 4-7). For example, as will be illustrated in more detail in following paragraphs, one or more mirrors may be associated with a device where one or more of those mirrors may be virtualized. As another example, a virtualized device may have an associated protection level in a manner similar to that as may be provided for local devices of a data storage system. A data protection level and technique providing such protection may be specified for a virtualized device. For example, a LUN or LV (or a mirror thereof) may be configured from storage of a RAID-5 group providing a level of data protection. As known in the art, there are a number of different RAID (Redundant Array of Independent or Inexpensive Disks) levels and techniques that may be used in connection with providing a combination of fault tolerance and/or improved performance for data storage devices. For example, RAID-5 techniques can be used in connection with a data storage system to protect from a single device failure with block level striping and distributed parity information, and RAID-6 provides protection from two devices of the RAID group failing with two sets of distributed parity and block level striping. The particular RAID levels described herein are merely exemplary and not a limitation of the techniques described herein.

As yet another example, different services, such as the Remote Data Facility (RDF) product provided by EMC Corporation, may be used in connection with providing data replication services of storage devices including virtualized storage devices. In some instances, it may be desirable to copy data from one storage device to another such as for purposes of data replication. For example, if a host writes data to a first storage device of the first data storage system, it may be desirable to copy that data to a second storage device of a second data storage system provided in a different location so that if a disaster occurs that renders the first storage device and/or first data storage system inoperable, the host (or another host) may resume operation using the data of the second storage device. Such a capability is provided, for example, by the RDF product provided by EMC Corporation of Hopkinton, Mass. Data storage communication between Symmetrix™ data storage systems using RDF is described, for example, in U.S. Pat. Nos. 5,742,792 and 5,544,347, both of which are incorporated by reference herein. With RDF, a user may denote a first or local storage device as a master storage device and a second or remote storage device as a slave storage device. Other incarnations of RDF may provide a peer to peer relationship between the local and remote storage devices. The host interacts directly with the first or local storage device, but any data changes made to the local storage device are automatically provided to a second remote storage device using RDF. The local and remote storage devices may be connected over a connection between RAs of the foregoing first and second storage systems. The local device on the first data storage system accessed by the host may be referred to as the "R1" volume while the corresponding logical device on the remote second data storage system may be referred to as the "R2" volume. In operation, the host may read and write data using an R1 volume in the first data storage system, and RDF may handle the automatic copying and updating of data from the R1 volume to the R2 volume in the remote data storage system. In an embodiment utilizing RDF and also in accordance with techniques herein, an R1 RDF volume may be a virtualized device of a data storage system. For example with reference to FIG. 6, an R1 volume may be an LV mapped to LUN 4 of 106*a* (virtualized device of 104) or LUN 1 of 104*a* (actual local device of 104). In accordance with techniques herein, LUN4 may be an R1 RDF volume which appears as a virtualized local device of the system 104 and may be remotely mirrored on another data storage system including a corresponding R2 volume using RDF.

The foregoing are just some of the services and operations that may be performed in connection with virtualized devices of a data storage system (e.g., devices 106*a* and 108*a* with respect to system 104) using techniques herein just as such services and operations may be performed in connection with actual or non-virtualized local devices of the data storage system (e.g., devices 104*a* with respect to system 104).

What will now be described are additional exemplary uses of the techniques herein.

Figure 8A:
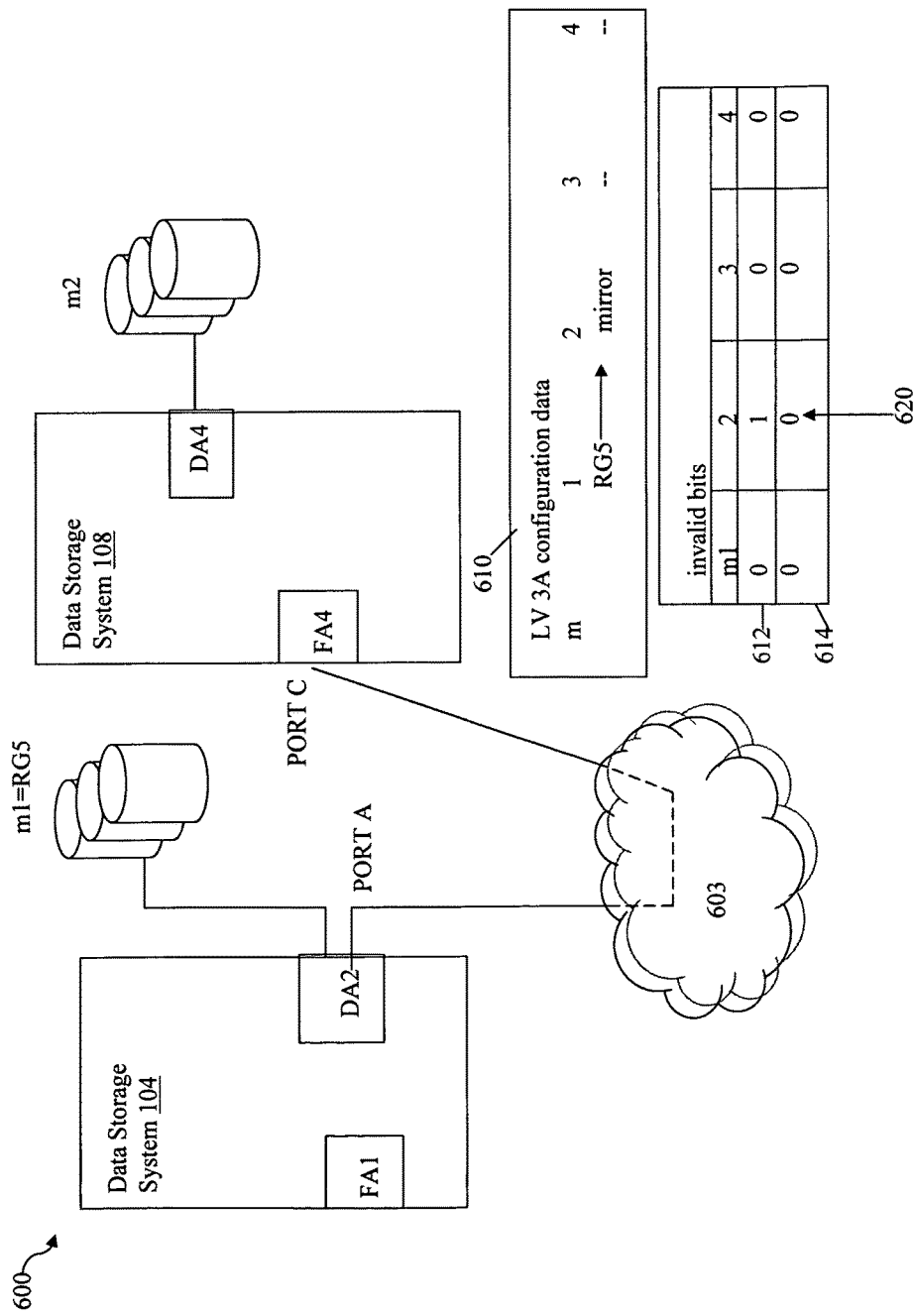
FIGS. 8A, 8B, 9B, and 10 are additional examples illustrating embodiments using the techniques herein.
Figure 8B:
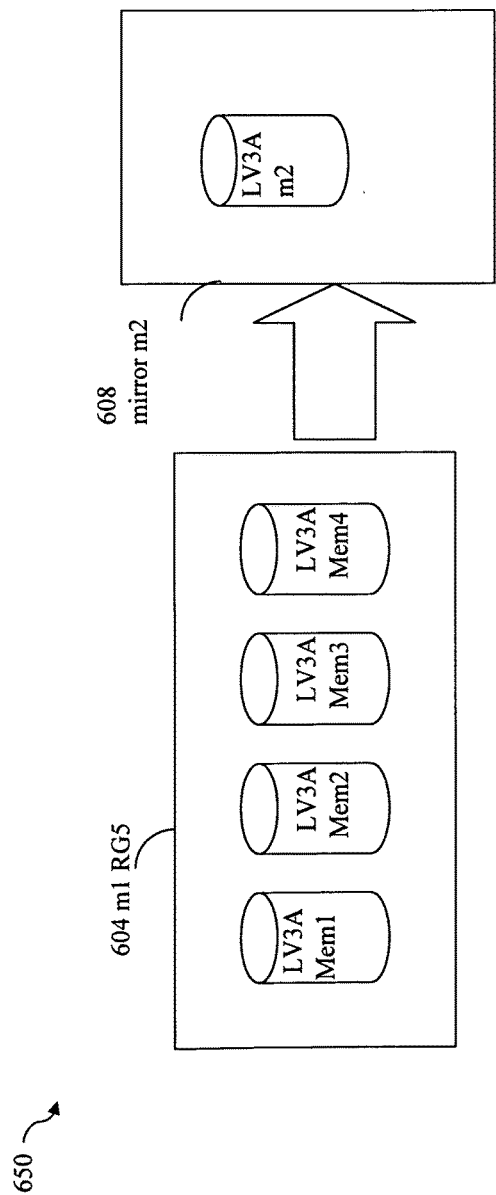

Referring to FIGS. 8A and 8B, shown is an example illustrating use of the techniques herein in connection with performing data migration. With reference to 600 of FIG. 8A, shown are data storage systems 104 and 108 in an arrangement as described above in connection with techniques herein. DA2 services local storage devices within the data storage system 104. DA2 also services one or more virtualized devices of 104 where the virtualized storage devices are external with respect to system 104 and actually included in data storage system 108. The virtualization is provided as described using techniques herein where DA2 of 104 has connectivity to FA4 of 108, such as through the network 603. The foregoing connectivity is used to provide for devices of system 108 appearing as virtual devices of the system 104 through the back end component, DA2.

At various points in time, there may be a need or desire to migrate data from a source to a target, such as to migrate user data from a source device to a target device. It may be desirable for such migration to be performed in a transparent, non-disruptive manner with respect to applications and software that use the data. Described herein in following paragraphs are techniques that may be used in connection with performing a data migration, such as between mirrors m1 and m2 of LV3A, using functionality of the DA to place an invalid mirror in a valid state by copying data from a valid mirror (source) to the invalid mirror (target). In this example, the source and targets of the migration may be denoted as mirrors of LV3A and may have the same or different type and/or level of data protection. For example, the source and targets may each have a different protection level where m1 may use RAID-5 storage and m2 may be a mirror which does not itself implement any RAID protection. Rather, m2 may be, for example, a single device mirror. The source and targets may be located on physical devices of the same or different type. For example, the source may be located on one of a flash drive, SATA disk drive, FC (fibre channel) drive, and the like, and the target may be located on a different one of the foregoing types of devices. An embodiment in accordance with techniques described herein may perform the data migration so that an application (such executing on a host) may continuously access and use the data during the migration process. In connection with the foregoing, the application I/Os of the data may not be suspended and rather, the application may be allowed to issue I/Os with respect to the data while the data is being migrated. For example, the host may read data from LV3A while the migration is in progress where the data is read from a valid LV3A mirror. The migration techniques are illustrated and described in more detail below with respect to an LV and its mirrors.

Element 610 indicates the configuration data for LV3A of data storage system 104. In the example 600, the LV3A may include up to 4 mirrors as indicated by the configuration data 610, where each mirror location is denoted by an "m" (mirror position). As indicated by 610, mirrors m1 and m2 are currently mapped for LV3A with unmapped or unused mirrors indicated by "-" in the mirror positions. Mirror m1 of LV3A is mapped to a RAID 5 group (denoted RG5). RG5, or m1 of LV3A, includes devices which are local within the system 104 and serviced by DA2. Mirror m2 of LV3A is mapped to single device. M2 of LV3A is a device which is external with respect to the system 104 and serviced by DA2. M2 device(s) may be characterized as virtualized devices of the system 104 where such virtualized devices are externally located within another data storage system 108. The system 108 has connectivity to the system 104 where DA2 uses the techniques herein to provide devices of system 108 as virtualized devices of the system 104.

As illustrated in FIG. 8B, the storage for m1 RG5 is represented by 604 and the storage for m2 is represented by 608. The storage 604 for m1 or RG5 includes 4 RAID group members (each member "N" denoted "mem N") for a 3+1 RAID configuration of 3 data members and 1 parity member. Any RAID 5 protection technique may be used. Data from LV3A m1 604 will be migrated to mirror m2 which is illustrated as a single device.

In the configuration data 610 of FIG. 8A for LV3A, m2 is currently invalid as represented by the m2 position of element 612. Element 612 indicates the state of the invalid bits for each mirror position collectively. An invalid bit=1 means that the data of that mirror is invalid, is not up to date, and cannot supply a valid copy of the LV3A data such as in connection with servicing a read I/O operation for a track thereof. Invalid=0 means that no updating of the data for the associated mirror is necessary. Invalid=0 may occur when the mirror position is not in use as well as when a mirror is in use but does not require updating (e.g., can supply a valid copy of the LV3A data). Each LV may include multiple tracks and an embodiment may store an invalid bit for each track. In such an embodiment, each of the invalid bit values of 612 corresponding to a single mirror may collectively represent an invalid state with respect to all tracks of the LV3A's respective mirror positions (e.g., invalid bit m2=1 means that one or more tracks of data for this mirror are invalid; Invalid bit m2=0 means the all tracks of data for this mirror are valid). In an embodiment in which an invalid bit is associated with each individual data track, the invalid bit associated with each track of m2 for LV3A may be set as part of processing represented in connection with FIG. 8A. Element 602 represents an initial or start state of invalid bits where m2 is denoted as containing an invalid copy of the data for LV3A. In the event that the RAID group is unable to supply a valid copy of the user data, the invalid bit of an LV mirror mapped to the RAID group (using the RAID group storage so that LV data is stored in the RAID group) may be set (invalid=1) as represented by the m2 position of 602. Element 614 represents a final or ending state of invalid bits after data has been copied to m2 from a valid mirror, m1, thus restoring m2 to its valid state as indicated by 620.

Once the invalid bit for m2 of 612 is set, processing may be performed by the DA to transition m2 to the valid state (e.g., where m2 contains a valid copy of the data for LV3A) as represented by 614. In order to transition m2 to a valid state, the DA2 may perform processing to synchronize the invalid mirror m2 with a valid mirror m1. In this example with reference to FIGS. 8A and 8B, LV3A m2 is synchronized from RG5 (LV3A m1). The synchronization processing may be performed by the DA2 executing a task, such as a background task, looking for invalid bit settings=1. The foregoing task may continuously monitor the status of the mirror invalid bits for all drives serviced by the DA, such as DA2. When a mirror of an LV is found having an associated invalid bit=1 indicating that the data of the mirror is invalid and requires updating, processing may be performed to accordingly update the mirror using data of another valid mirror for the LV. In other words, the task may perform processing to copy data from a valid mirror (such as m1 RG5 for LV3A) to the invalid mirror (such as m2 of LV3A). In one embodiment with reference to FIG. 8A, data from m1 LV3A may be retrieved from physical storage, stored in a cache slot of system 104 and indicated as write pending (WP) with respect to m2 LV3A, and then destaged at a later point in time to the physical storage device for m2 LV3A. This destaging performed by the DA2 transmits data from DA2 through network 603, and to FA4 of system 108. The FA4 may then provide for communicating the transmitted data to DA4 internally within the system 108 so that the data can be written out to device m2. For example, the FA4 may place the data in cache of the system 108 for processing in a manner similar to that as described for system 104 elsewhere herein. FA4 may place the data in cache of 108 and mark the data as WP to be destaged by the DA4. At some point later, the DA4 destages the data to the appropriate device appearing as a virtualized m2 device for LV3A of system 104. The foregoing may be performed with respect to each track of data of m1 to be written to m2 of LV3A. In such an embodiment, the DA2 may clear the invalid bit for a track when that track of data from m1 is stored in cache of system 104 and may not yet have been destaged or written out to the physical storage device for m2 LV3A. DA2 may clear a corresponding WP flag for data within the cache of system 104 when DA2 receives confirmation from the system 108 regarding successful completion status of the requested write operation. It should be noted that such confirmation may be sent from the system 108 based on any one of a variety of different ways in which such completion may be determined by the system 108. For example, the system 108 may send the confirmation indicating successful completion of the write operation when the data of m2 has been written to cache of 108, after the data has been destaged by DA4 to the appropriate m2 device, and the like.

It should be noted that with respect to data from tracks of m1 being stored in cache of system 104 which have not yet been destaged (indicated as WP) to m2, destaging includes writing out user data and also any protection information (e.g. parity information (such as diagonal bits) or other protection information based on one or more bits of user data) that may be used for the particular RAID level and technique to provide data protection for m2. For example, if m2 is configured as a RAID group, destaging data to m2 may include determining and writing out any protection information for the user data being destaged. In connection with the foregoing, it should be noted that the system 104 writes out the user data to system 108. The parity information, or more generally, any protection information such as used with a particular RAID level for configured storage of the system 108, may be determined by the system 108 based on the user data received. The system 108 may determine the protection information prior to writing out the user data and then stored the protection information along with the user data on the appropriate physical storage device(s) of the system 108.

As described above in connection with destaging cached data, the writing of the data to physical devices may be performed independently and asynchronously with respect to when the data is stored in the cache. Other embodiments may use other techniques in connection with validating or verifying that the user data will be or has been stored on the physical device for the mirror m2.

At this point, the progress of the synchronization of m2 from RG5 m1 may be monitored by the DA2 until, for all tracks in the LV3A, the invalid bits for the mirror m2=0. This is represented in FIG. 8A by element 620.

In connection with the foregoing example of FIGS. 8A and 8B, m1 of LV3A uses local storage devices of the data storage system 104, and m2 of LV3A uses virtualized storage devices of data storage system 104 in connection with the techniques herein. In this example, the virtualized storage devices of m2 for LV3A appear as if they are included within the storage system 104 in accordance with techniques herein. The fact that storage devices for m2 are external with respect to the data storage system 104 (e.g., included in another data storage system 108 accessible via the DA2 connected to the network 603) may be transparent to a host or other client of the data storage system 104 as well as other components of 104 besides the DA. Using the virtualization techniques herein, functionality of the DA may be used to perform operations on virtualized storage devices in a manner similar to that as may be performed for storage devices which are local or included within the data storage system 104. FIGS. 8A and 8B illustrate one particular example of how functionality of the DA may be leveraged and used in connection with virtualized devices.

As described above, the source LV mirror of the data migration may be a valid mirror having a same or different protection level than the invalid mirror, where the invalid mirror is the target location of the data migration. A protection level may be, for example, a RAID protection level as well as a single LV which does not implement a RAID protection scheme. Additionally, the source and target storage devices may be the same or different with respect to, for example, device type, attributes, performance characteristics, and the like. For example, the source and target locations may differ with respect to both protection and device type and attributes. The source data for LV3A may be stored on an SATA drive with RAID-5 protection. The foregoing source data may be migrated to a faster or different drive, such as a flash memory drive, having a different protection, such as no protection in this example. Alternatively, for example, m2 may be configured in accordance with RAID-6 or another level of protection.

It should be noted that the foregoing illustrates using the techniques herein for migrating data from a source which is first mirror local within data storage system 104 to a target which is a second mirror located external with respect to data storage system 104. As a variation to the foregoing, the techniques herein may also be used for migrating data from a source which is first mirror located external with respect to data storage system 104 to a target which is a second mirror local within data storage system 104. For example with reference to FIGS. 8A and 8B, the techniques herein may be used to migrate data from m2 of LV3A to m1 of LV3A by invalidating m1 and indicating m2 as a valid mirror. In connection with this latter case, the DA migrates data from m2 to m1 to transition an invalid mirror, m1, to a valid mirror state by copying data from valid mirror m2 (source) to the invalid mirror m1 (target).

Figure 9A:
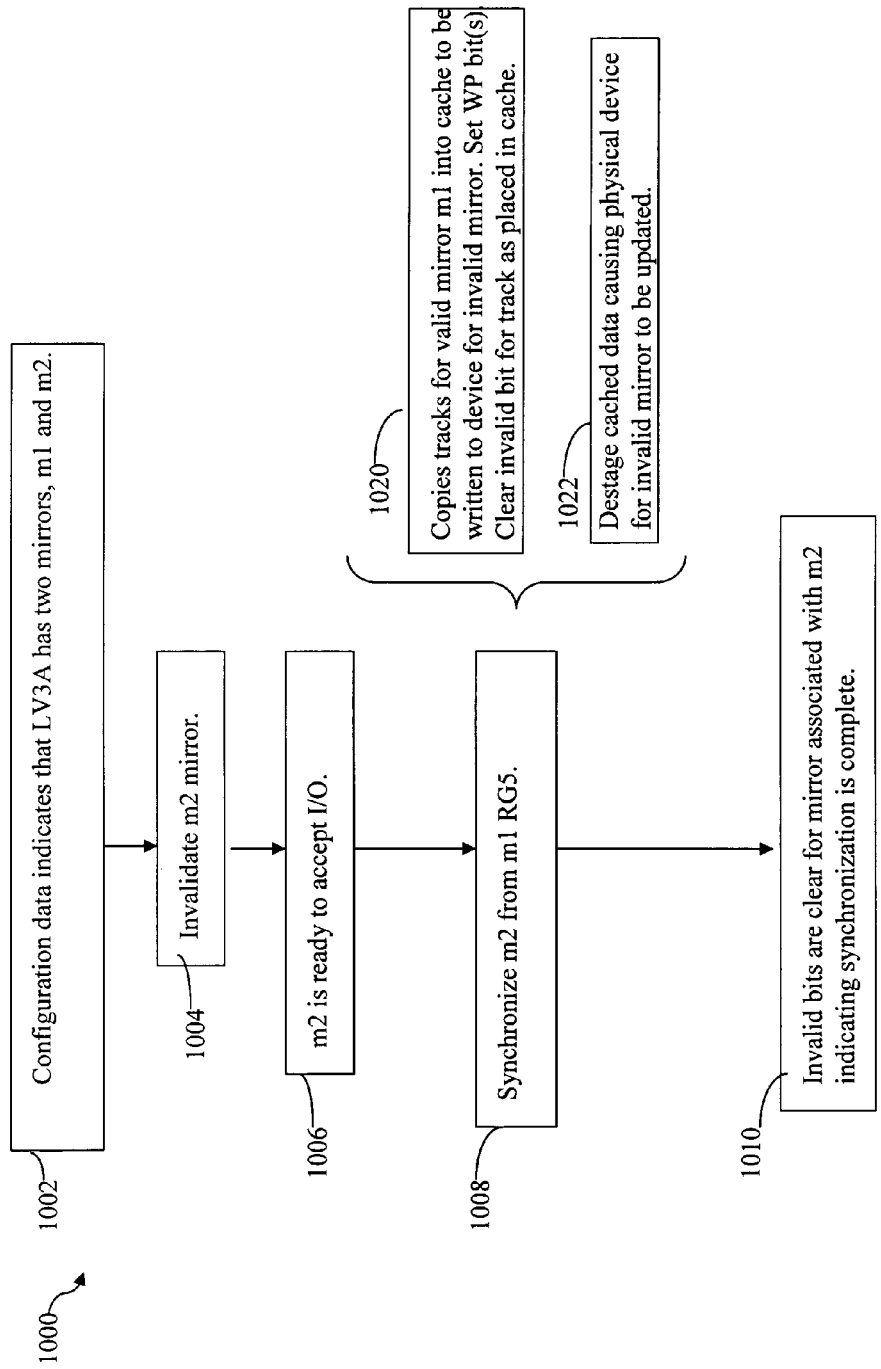
FIG. 9A is a flowchart of processing steps that may be performed in an embodiment in accordance with techniques herein for data migration.

Referring to FIG. 9A, shown is a flowchart of processing steps as may be performed in an embodiment in accordance with techniques herein as just described above. The flowchart 1000 summarizes processing described above with reference to the particular example of FIGS. 8A and 8B. However, it will be appreciated to those skilled in the art that the data migration techniques may also be applied in connection with other protection levels and variations than as described herein. At step 1002, the configuration data for LV3A indicates that LV3A has two mirrors, m1 and m2, where m1 may be RG5 and m2 may be a single device which does not utilize RAID protection as illustrated in FIGS. 8A and 8B. At step 1004, processing is performed to invalidate the m2 mirror (e.g., per setting invalid bits for all tracks of the mirror m2). At step 1006, m2 is ready to accept I/O.

At step 1008, m2 of LV3A is synchronized from RG5 (m1 of LV3A). Synchronization of step 1008 may include performing steps 1020 and 1022. At step 1020, data for tracks of m1 (RG5) may be copied into cache of system 104 to be written out and destaged to physical storage for m2. As each track of data is read into cache of the system 104, the associated cache entry containing the track of data has its WP bit set (indicating the cached data as write pending and needs to be destaged to physical storage associated with m2). Additionally, the invalid bit for the track of m2 is cleared after the data for the track from m1 has been stored in cache of the system 104. At some subsequent point in time, the one or more tracks of cached data are destaged by DA2 causing the physical device for the invalid mirror m2 to be updated as in step 1022. In accordance with techniques herein as described above, destaging m2 data by DA2 includes the DA2 transmitting the data to system 108 for writing to the physical devices of m2 included in the system 108. Step 1008, and associated substeps 1020 and 1022, are as described above and may be performed, for example, by a DA. Step 1022 may be performed asynchronously or independent of when the invalid bits for m2 are cleared. Step 1010 is performed after completion of step 1020 but completion of step 1022 may not be needed in order to proceed to step 1010 in this exemplary embodiment. In step 1010, the invalid bits for all tracks of the mirror m2 are clear (=0) indicating that m2 contains a valid copy of all tracks of LV3A.

With reference to FIG. 9A, it should be noted that steps 1002, 1004 and 1006 may be initiated or driven by code executing on a service processor connected to a data storage system where such code instructs the data storage system to subsequently perform processing associated with the steps. Setting the invalid bit(s) for tracks of data in step 1004 causes the DA, such as DA2 of the data storage system 104, to perform the synchronization of step 1008. Code of the service processor may then perform the monitoring associated with step 1008 to determine when the state indicated by step 1010 is reached where all invalid bits for tracks of data for the invalid LV mirror m2 are cleared. It should be noted that all, or a portion of, the foregoing steps as may be performed by the service processor may also be performed by the data storage system, such as a data storage array, or other component having connectivity thereto.

Figure 9B:
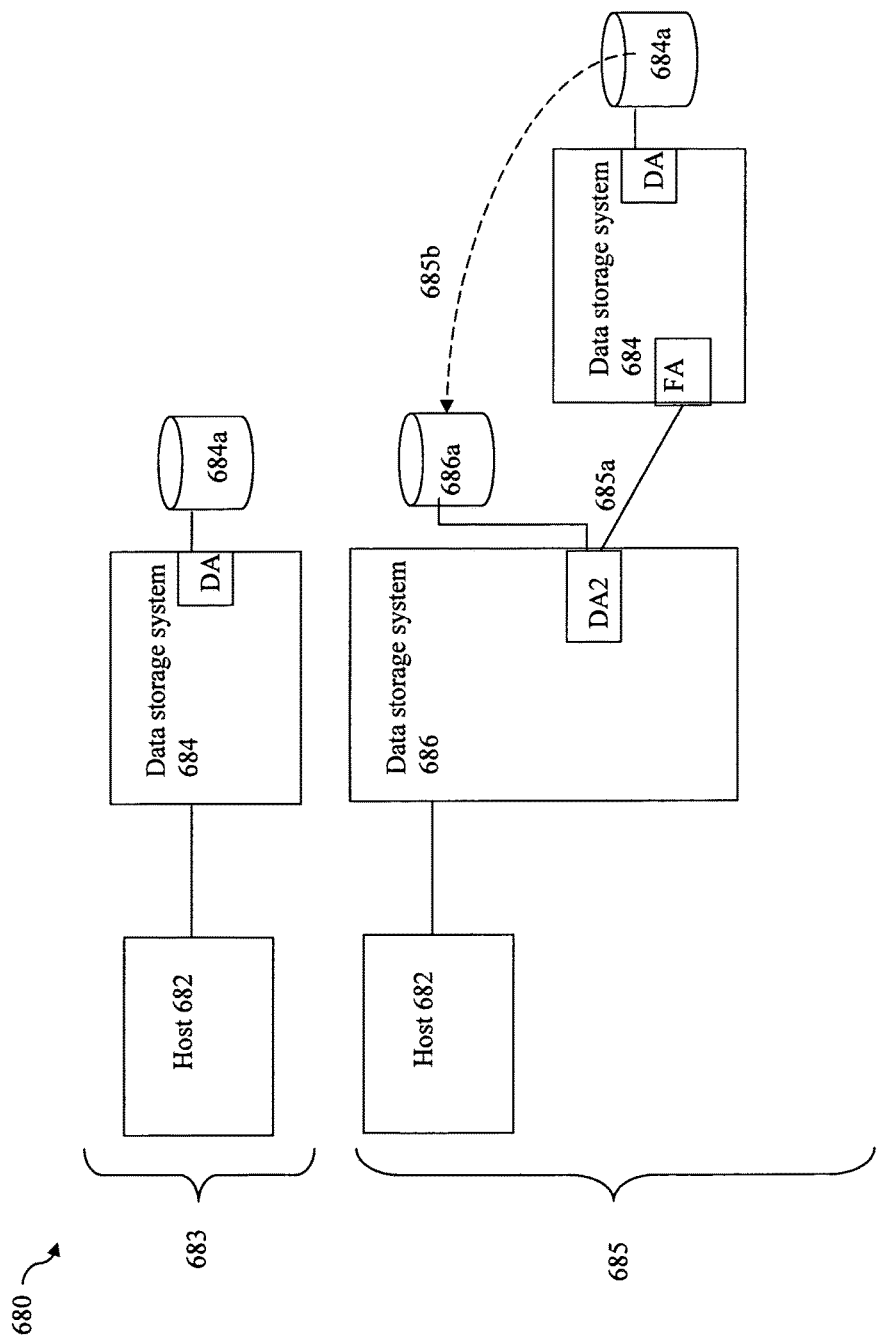

With reference to FIG. 9B as another example illustrating use of techniques herein in an embodiment, element 683 may represent an initial arrangement where a host 682 may be initially connected directly to data storage system 684 and may perform operations on data stored on device 684a. At a later point in time as illustrated by element 685, it may be desirable to replace system 684 with a new data storage system 686. In this case, it may be desirable to first migrate or copy data from the device 684a to another device of the new data storage system 686. At the later point in time as illustrated by 685, the host 682 may be disconnected from system 684 and reconnected directly to system 686. Additionally, to facilitate the migration or copying of existing data from 684a to a new device 686a, techniques herein may be used to connect DA2 of the system 686 to the system 684 (685a), configure 684a and 686a as two mirrors (e.g., m1 and m2) of a same logical device, and indicate 686a as an invalid mirror and 684a as a valid mirror. In a manner similar to that as described above in connection with FIGS. 8A and 8B, DA2 may perform processing to migrate (685b) data from the valid mirror 684a to the invalid mirror 686a. Once the foregoing migration is complete, the system 684 may be disconnected from 686 (e.g., disconnect 685a) and the host may use the data of 686a.

Figure 10:
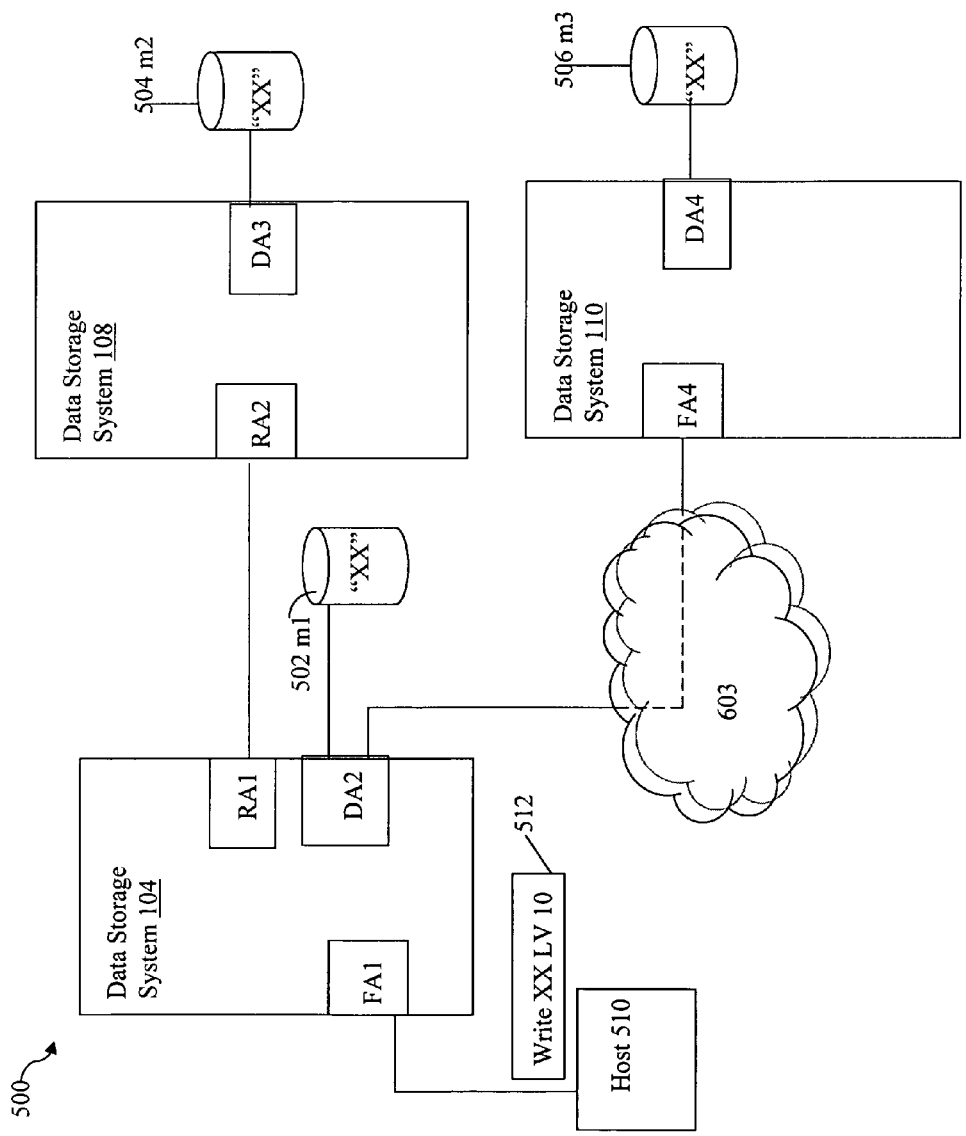

Referring to FIG. 10, shown is another example illustrating use of techniques herein in an embodiment. The example 500 illustrates an exemplary use of RDF in an embodiment in accordance with techniques herein. LV 10 of data storage system 104 may be configured as a device having three mirrors m1 (502), m2 (504) and m3 (506) where LV 10. The host 510 may issue an IO request 512 to write "XX" to LV 10. Since LV 10 has 3 mirrors, the same data XX is written to all mirrors of LV 10. As illustrated, m1 and m3 may be serviced by DA2. Mirror m1 502 is local to system 104, m2 504 may be a remote RDF mirror of m1 (e.g., m1 may be defined as the R1 RDF volume and m2 may be defined as the corresponding R2 RDF volume), and m3 506 may be configured as a virtualized device mirror which is external to the system 104. Data may be written to m1 502 and then to mirrors m2 and m3. In accordance with RDF, data written to an R1 device (m1) is automatically copied to its corresponding R2 device (m2) by communications between RA1 and RA2. Additionally, DA2 performs processing to write out the data XX of the write request 513 to m3 506 thereby updating and synchronizing m3 with the other mirrors of LV10. In system 108 in connection with updating m2, it should be noted that RA2 may communicate the received data to DA3 using cache and global memory of 108 (not illustrated). In a manner similar to that as described above with an FA, the data "XX" may be written to cache of the system 108, marked as WP, and then destaged at a later point in time by DA3 to the device m3 504.

The techniques herein may be performed by executing code which is stored on any one or more different forms of computer-readable media. Computer-readable media may include different forms of volatile (e.g., RAM) and non-volatile (e.g., ROM, flash memory, magnetic or optical disks, or tape) storage which may be removable or non-removable.

Figure 11:
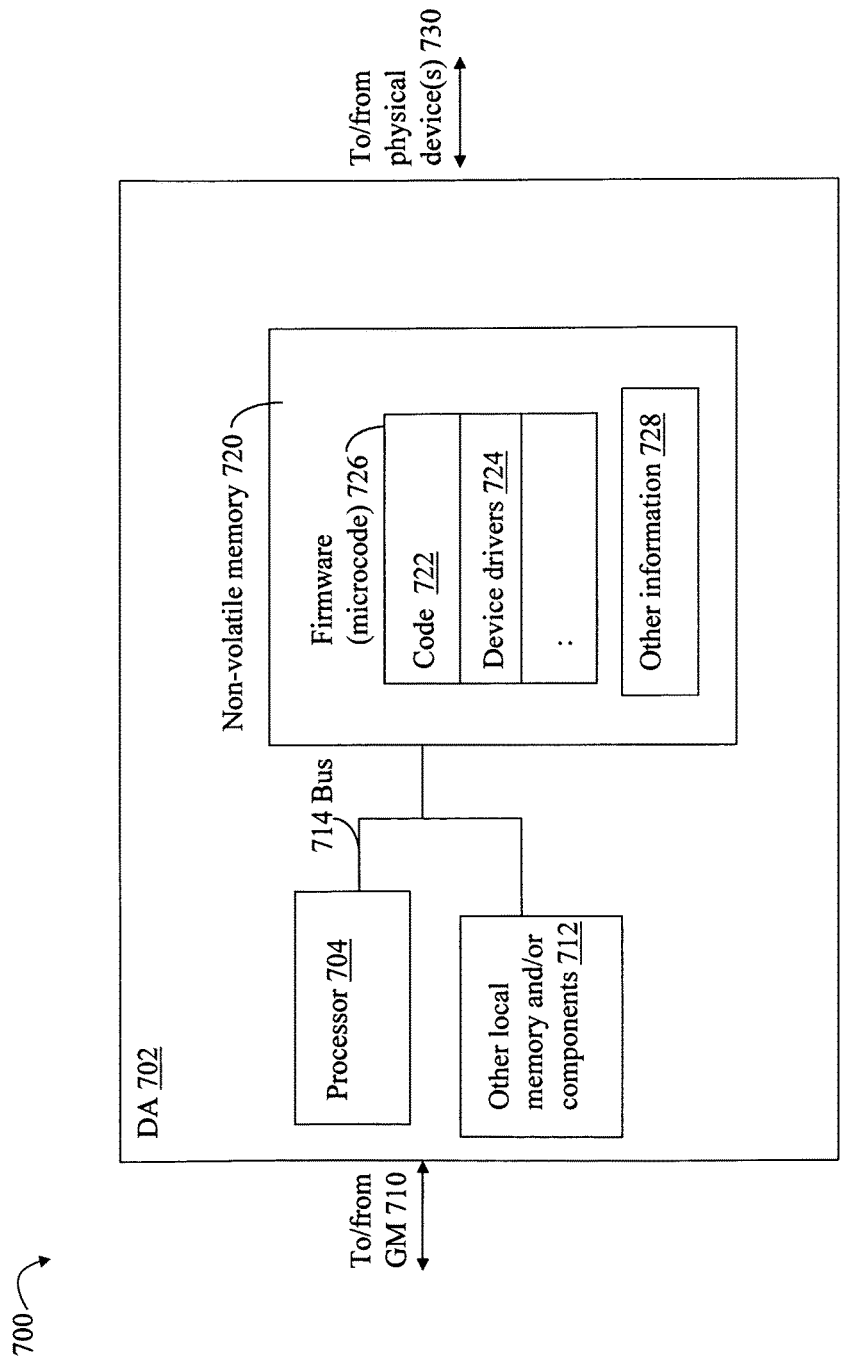
FIG. 11 is an example illustrating in more detail a director that may be included in an embodiment in accordance with techniques herein.

Referring to FIG. 11, shown is an example illustrating a DA in more detail as may be included in an embodiment using the techniques herein. The example 700 illustrates a DA 702 including a processor 704, non-volatile memory (NVM) 720 and other local memory and/or components 712 which communicate over an internal bus 714. The components included in 702 may be characterized as local to the DA 702. The DA 702 may communicate with the global memory (GM) as illustrated by 710 and write/read data to/from the physical devices as illustrated by 730. The NVM 720 may include microcode or firmware 726. The firmware 726 may include code 722, device drivers 724, and other code used by the DA. The code 722 may include code for performing the processing described herein as may be performed by the DA for virtualized storage devices as well as other operations and functionality that may be performed by a DA such as destaging data to devices serviced by the DA, reading data from devices serviced by the DA, performing processing to restore an invalid mirror to a valid state (e.g., by copying data from a valid mirror to an invalid mirror), and the like. The NVM 720 may also include other information 728, such as code and/or data used by the DA.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A computer implemented method for processing a data request comprising:
    receiving, at a first front end component of a data storage system, the data request directed to a first device of a plurality of devices of the data storage system, said plurality of devices comprising one or more local devices and one or more virtualized devices, wherein each of said one or more local devices is a storage device included in the data storage system and each of said one or more virtualized devices is an external storage device with respect to the data storage system and is presented as a local storage device of the data storage system, wherein said first device is a first virtualized device included in said one or more virtualized devices of the data storage system; and
    performing first processing by a disk adapter of the data storage system in connection with servicing the data request for said first device, wherein said disk adapter of the data storage system accesses one or more physical storage devices of the data storage system, wherein said disk adapter and said first front end component are included in the data storage system as two separate components of the data storage system, said first processing including sending the data request to a first external storage device, that is included in a second data storage system and corresponds to the first virtualized device, over a connection in accordance with path information obtained from discovery processing, wherein said data request is sent by said first processing over a path identified by said path information and the path is from a first port of the disk adapter to another port of a front end component of the second data storage system.

2. The method of claim 1, wherein the disk adapter is connected to a network providing connectivity to the second data storage system including said external storage device corresponding to the virtualized device.

3. The method of claim 2, wherein the data request is transmitted to the second data storage system using said path.

4. The method of claim 3, wherein said discovery processing is performed by the disk adapter to determine connectivity between at least one port of the disk adapter and other network entities including the second data storage system.

5. The method of claim 1, wherein the disk adapter is directly connected to the second data storage system including said first external storage device.

6. The method of claim 1, wherein said data request identifies said first device using a local device identifier of the data storage system, each of said plurality of devices being associated with a different local device identifier and uniquely identifying said each device of said plurality of devices from others of said plurality of devices.

7. Method of claim 1, wherein said first processing is performed by the disk adapter as part of destaging data from a cache of the data storage system to the first virtualized device.

8. The method of claim 1, wherein the data storage system includes a first logical device that has a plurality of mirrors including a first mirror and a second mirror, said first mirror being a first of said one or more local devices and said second mirror being a first of said one or more virtualized devices, said first and said second mirrors being serviced by said disk adapter.

9. The method of claim 8, further comprising:
    setting one of said first mirror and said second mirror as an invalid mirror and the other of said first mirror and said second mirror as a valid mirror, wherein said invalid mirror does not include a valid copy of data for said first logical device; and
    in response to said one mirror being an invalid mirror, performing second processing by said disk adapter to copy data from said valid mirror to said invalid mirror.

10. The method of claim 8, wherein said second mirror is associated with a device included in a second data storage system having connectivity to said disk adapter over a network connection.

11. The method of claim 9, wherein said disk adapter uses path information obtained by discovery processing to send the data that is copied from said valid mirror to said invalid mirror.

12. The method of claim 11, wherein said valid mirror is configured from storage for a RAID group providing a level of data protection.

13. The method of claim 12, wherein said invalid mirror is a single device that is not configured from storage for a RAID group.

14. A data storage system comprising:
    a first set of one or more local storage devices included in the data storage system;
    a first front end component that receives a request from a host; and
    a disk adapter having connectivity to a second set of one or more storage devices that are external with respect to the data storage system, wherein each storage device of said second set of devices is a virtualized storage device presented as a local storage device of the data storage system, and wherein the data storage system includes first executable code stored on computer readable medium and said disk adapter is configured to execute the first executable code, the computer readable medium comprising the first executable code that:
    determines whether a request is directed to a local storage device or a first virtualized storage device of the data storage system included in the second set; and
    if the request is directed to the first virtualized storage device, transmits the request to an external storage device, that is included in a second data storage system and corresponds to the first virtualized storage device, over a connection in accordance with path information obtained from discovery processing, wherein said request is sent over a path identified by the path information and the path is from a first port of the disk adapter to another port of a front end component of a second data storage system, and wherein said disk adapter of the data storage system accesses one or more physical storage devices of the data storage system, said disk adapter and said first front end component of the data storage system being separate components of the data storage system.

15. The data storage system of claim 14, wherein each storage device in said first set and each storage device in said second set is referenced by a local device identifier of the data storage system.

16. The data storage system of claim 15, wherein a data request directed to a first storage device included in any of the first set and the second set references a local device identifier of the data storage system bound to the first storage device.

17. The data storage system of claim 14, wherein a first logical device of the data storage system is configured to have a first mirror and a second mirror, at least one of said first mirror and said second mirror being one of said storage devices in said second set of virtualized storage devices.

18. A computer readable memory comprising executable instructions thereon for processing a data request, the computer readable memory comprising executable instructions for:
receiving, at a first front end component of a data storage system, the data request directed to a first device of a plurality of devices of the data storage system, said plurality of devices comprising one or more local devices and one or more virtualized devices, wherein each of said one or more local devices is a storage device included in the data storage system and each of said one or more virtualized devices is an external storage device with respect to the data storage system and is presented as a local storage device of the data storage system, wherein said first device is a first virtualized device included in said one or more virtualized devices of the data storage system; and
performing first processing by a disk adapter of the data storage system in connection with servicing the data request for said first device, wherein said disk adapter of the data storage system accesses one or more physical storage devices of the data storage system, wherein said disk adapter and said first front end component are included in the data storage system as two separate components of the data storage system, said first processing including sending the data request to a first external storage device, that is included in a second data storage system and corresponds to the first virtualized device, over a connection in accordance with path information obtained from discovery processing, wherein said data request is sent by said first processing over a path identified by said path information and the path is from a first port of the disk adapter to another port of a front end component of the second data storage system.

19. The computer readable memory of claim 18, wherein the disk adapter is connected to a network providing connectivity to the second data storage system including said external storage device corresponding to the virtualized device.

* * * * *